United States Patent
Shimazaki

(10) Patent No.: US 12,238,817 B2
(45) Date of Patent: *Feb. 25, 2025

(54) COMMUNICATING APPARATUS, COMMUNICATION METHOD, AND STORAGE MEDIUM STORING PROGRAM

(71) Applicant: CANON KABUSHIKI KAISHA, Tokyo (JP)

(72) Inventor: Atsushi Shimazaki, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/367,489

(22) Filed: Sep. 13, 2023

(65) Prior Publication Data

US 2023/0422014 A1 Dec. 28, 2023

Related U.S. Application Data

(63) Continuation of application No. 17/740,642, filed on May 10, 2022, now Pat. No. 11,792,632, which is a
(Continued)

(30) Foreign Application Priority Data

Apr. 26, 2013 (JP) .................................. 2013-094644

(51) Int. Cl.
*H04W 76/14* (2018.01)
*H04W 8/00* (2009.01)

(52) U.S. Cl.
CPC ............ *H04W 8/005* (2013.01); *H04W 76/14* (2018.02)

(58) Field of Classification Search
CPC .................................................. H04W 76/14
(Continued)

(56) References Cited

U.S. PATENT DOCUMENTS 6,157,465 A * 12/2000 Suda ..................... G06F 3/1204
358/1.15
7,724,712 B2 * 5/2010 Yoshida ............. H04N 1/33307
370/332
(Continued)

FOREIGN PATENT DOCUMENTS

JP 2005-303821 A 10/2005
JP 2011-124980 A 6/2011
(Continued)

OTHER PUBLICATIONS

A. Lavie, F. Pianesi and L. Levin, "The NESPOLE! System for multilingual soeech communication over the Internet," in IEEE Transactions on Audio, Speech, and Language Processing, vol. 14, No. 5, pp. 1664-1673, Sep. 2006, doi: 10.1109/TSA.2005.858520. (Year: 2006) (Year: 2006) (Year: 2006) (Year: 2006).*
(Continued)

*Primary Examiner* — Bharatkumar S Shah
(74) *Attorney, Agent, or Firm* — VENABLE LLP

(57) ABSTRACT

A communication apparatus performs a first communication processing to a communication partner apparatus using a first communication unit, establishes a wireless connection based on an infrastructure mode between the communication apparatus and an external access point, wherein the wireless connection is established with a second communication unit different from the first communication unit, and establishes a direct wireless connection between the communication apparatus and the communication partner apparatus which is the same as the communication partner apparatus of the first communication unit, wherein the direct wireless connection is established without the external access point. The wireless connection and the direct wireless connection are concurrently performed, and the external access point is searched in a state that the direct wireless connection is maintained, in a case where the wireless connection disconnected,
(Continued)

wherein the external access point is external to the communication apparatus and is external to the communication partner apparatus.

27 Claims, 10 Drawing Sheets

Related U.S. Application Data continuation of application No. 16/857,323, filed on Apr. 24, 2020, now Pat. No. 11,356,836, which is a continuation of application No. 15/825,608, filed on Nov. 29, 2017, now Pat. No. 10,667,117, which is a continuation of application No. 15/646,396, filed on Jul. 11, 2017, now Pat. No. 9,867,029, which is a continuation of application No. 14/257,139, filed on Apr. 21, 2014, now Pat. No. 9,730,045.

(58) Field of Classification Search
USPC ........................................... 358/1.15
See application file for complete search history.

(56) References Cited

U.S. PATENT DOCUMENTS

| | | | |
|---|---|---|---|
| 8,259,332 B2 | 9/2012 | Shimazaki | |
| 8,358,222 B2* | 1/2013 | Gueziec | G08G 1/09675 |
| | | | 340/905 |
| 8,521,531 B1* | 8/2013 | Kim | G06F 16/7844 |
| | | | 704/275 |
| 8,553,252 B2 | 10/2013 | Shimazaki | |
| 9,125,238 B2 | 9/2015 | Ejima | |
| 9,137,751 B2* | 9/2015 | Huang | H04W 52/0216 |
| 9,288,826 B2* | 3/2016 | Shibata | H04N 1/00307 |
| 9,288,838 B2 | 3/2016 | Shimada | |
| 9,448,753 B2 | 9/2016 | Shimazaki et al. | |
| 10,091,827 B2* | 10/2018 | Lee | H04N 1/00204 |
| 2002/0016841 A1 | 2/2002 | Hirashima et al. | |
| 2003/0229900 A1* | 12/2003 | Reisman | H04N 21/422 |
| | | | 348/E7.071 |
| 2005/0148326 A1* | 7/2005 | Nogawa | H04W 8/22 |
| | | | 455/420 |
| 2006/0232819 A1* | 10/2006 | Kasamatsu | H04L 41/0803 |
| | | | 358/1.15 |
| 2007/0081197 A1* | 4/2007 | Omoigui | G06F 16/36 |
| | | | 358/1.15 |
| 2007/0128899 A1* | 6/2007 | Mayer | G06F 9/4406 |
| | | | 439/152 |
| 2008/0194201 A1 | 8/2008 | Sinivaara et al. | |
| 2008/0204801 A1* | 8/2008 | Kunii | H04N 1/00281 |
| | | | 358/1.15 |
| 2008/0207168 A1* | 8/2008 | Forsberg | H04W 12/04 |
| | | | 455/411 |
| 2008/0225806 A1* | 9/2008 | Arian | H04W 8/065 |
| | | | 370/338 |
| 2009/0103124 A1* | 4/2009 | Kimura | G06F 3/1292 |
| | | | 358/1.15 |
| 2010/0033760 A1 | 2/2010 | Kimura | |
| 2010/0302958 A1 | 2/2010 | Wietfeldt et al. | |
| 2010/0069008 A1* | 3/2010 | Oshima | H04W 4/02 |
| | | | 455/41.3 |
| 2010/0214602 A1* | 8/2010 | Moriwaki | G06F 3/1221 |
| | | | 358/1.15 |
| 2010/0245886 A1* | 9/2010 | Okajima | G06F 3/1222 |
| | | | 358/1.15 |
| 2011/0082939 A1* | 4/2011 | Montemurro | H04W 76/14 |
| | | | 709/227 |
| 2011/0082940 A1* | 4/2011 | Montemurro | H04W 76/14 |
| | | | 709/227 |
| 2011/0225305 A1 | 9/2011 | Vedantham et al. | |
| 2011/0231922 A1* | 9/2011 | Azuma | H04L 63/0853 |
| | | | 726/9 |
| 2012/0032876 A1* | 2/2012 | Tabe | H01Q 1/245 |
| | | | 455/571 |
| 2012/0038948 A1* | 2/2012 | Park | G06F 3/1204 |
| | | | 358/1.15 |
| 2012/0084364 A1 | 4/2012 | Sivavakeesar | |
| 2012/0092714 A1* | 4/2012 | Suzuki | G06F 3/1236 |
| | | | 358/1.15 |
| 2012/0102106 A1* | 4/2012 | Chen | H04W 76/14 |
| | | | 710/305 |
| 2012/0120259 A1* | 5/2012 | Sakiyama | G06F 3/1292 |
| | | | 348/207.2 |
| 2012/0147420 A1* | 6/2012 | Nishimi | G06F 3/1292 |
| | | | 358/1.15 |
| 2012/0182432 A1* | 7/2012 | Okamoto | H04N 1/32523 |
| | | | 358/1.15 |
| 2012/0243029 A1* | 9/2012 | St. Jacques, Jr. | G06F 3/1204 |
| | | | 358/1.15 |
| 2012/0320413 A1* | 12/2012 | Nagasaki | H04W 4/02 |
| | | | 358/1.15 |
| 2012/0320414 A1* | 12/2012 | Shibata | H04W 8/005 |
| | | | 358/1.15 |
| 2013/0027743 A1* | 1/2013 | Enami | G06F 8/61 |
| | | | 358/1.15 |
| 2013/0044341 A1* | 2/2013 | Uchino | G06F 3/04883 |
| | | | 358/1.13 |
| 2013/0044739 A1* | 2/2013 | Huang | H04W 52/0216 |
| | | | 370/338 |
| 2013/0065627 A1* | 3/2013 | Jung | H04W 48/16 |
| | | | 455/515 |
| 2013/0066464 A1* | 3/2013 | Maskatia | G06Q 30/06 |
| | | | 700/237 |
| 2013/0100463 A1* | 4/2013 | Park | G06F 3/1228 |
| | | | 358/1.15 |
| 2013/0148149 A1 | 6/2013 | Park | |
| 2013/0148162 A1* | 6/2013 | Park | H04W 76/15 |
| | | | 358/1.15 |
| 2013/0166759 A1* | 6/2013 | Rajamani | H04L 69/16 |
| | | | 709/227 |
| 2013/0173267 A1* | 7/2013 | Washio | G10L 15/197 |
| | | | 704/240 |
| 2013/0258402 A1* | 10/2013 | Arai | G06K 15/40 |
| | | | 358/1.15 |
| 2013/0260682 A1* | 10/2013 | Suzuki | H04W 76/14 |
| | | | 455/41.1 |
| 2013/0262392 A1* | 10/2013 | Vibhor | G06F 16/178 |
| | | | 707/654 |
| 2013/0263289 A1* | 10/2013 | Vijayan | G06F 16/1748 |
| | | | 726/31 |
| 2013/0268970 A1* | 10/2013 | Ellis | H04N 21/4856 |
| | | | 725/47 |
| 2013/0346619 A1* | 12/2013 | Panuganty | H04L 41/12 |
| | | | 709/226 |
| 2014/0002862 A1 | 1/2014 | Shimzaki | |
| 2014/0078928 A1 | 3/2014 | Verma et al. | |
| 2014/0237132 A1 | 8/2014 | Yamaguchi | |
| 2014/0320908 A1* | 10/2014 | Iwauchi | H04L 45/24 |
| | | | 358/1.15 |
| 2014/0323060 A1 | 10/2014 | Shimazaki et al. | |
| 2014/0349577 A1 | 11/2014 | Matsuda | |
| 2014/0355527 A1* | 12/2014 | Vaidya | H04W 76/15 |
| | | | 370/329 |
| 2015/0056978 A1* | 2/2015 | Kobayashi | H04W 4/60 |
| | | | 455/420 |
| 2015/0095018 A1* | 4/2015 | Fructuoso | G10L 15/063 |
| | | | 704/9 |
| 2015/0195860 A1* | 7/2015 | Joshi | H04W 76/14 |
| | | | 370/338 |
| 2016/0073348 A1* | 3/2016 | Tsuzuki | H04W 52/0229 |
| | | | 358/1.13 |
| 2016/0192417 A1* | 6/2016 | Estevez | G06F 13/387 |
| | | | 455/41.2 |

(56) References Cited

U.S. PATENT DOCUMENTS

| | | | |
|---|---|---|---|
| 2016/0374053 A1* | 12/2016 | Hareuveni | H04W 60/005 |
| 2017/0339548 A1* | 11/2017 | Moriya | H04W 48/16 |
| 2019/0126775 A1* | 5/2019 | Han | B60L 3/12 |

FOREIGN PATENT DOCUMENTS

| | | |
|---|---|---|
| JP | 2011-199408 A | 10/2011 |
| JP | 2011-249960 A | 12/2011 |
| JP | 2011-250158 A | 12/2011 |
| JP | 2012-019487 A | 1/2012 |
| JP | 2012-529229 A | 11/2012 |
| JP | 2013-038724 A | 2/2013 |
| JP | 2014-107701 A | 6/2014 |

OTHER PUBLICATIONS

Narayanan and P. G. Georgiou, "Behavioral Signal Processing: Deriving Human Behavioral Informatics From Speech and Language," in Proceedings of the IEEE, vol. 101, No. 5, pp. 1203-1233, May 2013, doi: 10.1109/JPROC.2012.2236291. (Year: 2013 ) (Year: 2013) (Year: 2013) (Year: 2013).*

Cerekovic et al., "Towards an Embodied Conversational Agent Talking in Croatian," 2007 9th International Conference on Telecommunications, 2007, pp. 41-48, doi: 10.1109/CONTEL.2007.381848. (Year: 2007) (Year: 2007) (Year: 2007).*

Narayanan and P. G. Georgiou, "Behavioral Signal Processing: Deriving Human Behavioral Informatics From Speech and Language, " in Proceedings of the IEEE, vol. 101, No. 5, pp. 1203-1233, May 2013, doi: 10.1109/J PROC.2012.2236291. (Year: 2013 ) (Year: 2013) (Year: 2013) (Year: 2013) (Year: 2013).*

Cerekovic et al., "Towards an Embodied Conversational Agent Talking in Croatian," 2007 9th International Conference on Telecommunications, 2007, pp. 41-48, doi: 10.1109/CONTEL.2007.381848. (Year: 2007) (Year: 2007) (Year: 2007) (Year: 2007).*

A. Lavie, F. Pianesi and L. Levin, "The NESPOLE! System for multilingual soeech communication over the Internet, " in IEEE Transactions on Audio, Speech, and Language Processing, vol. 14, No. 5, pp. 1664-1673, Sep. 2006, doi: 10.1109/TSA.2005.858520. (Year: 2006) (Year: 2006) (Year: 2006) (Year: 2006 (Year: 2006).*

Narayanan and P. G. Georgiou, "Behavioral Signal Processing: Deriving Human Behavioral Informatics From Speech and Language," in Proceedings of the IEEE, vol. 101, No. 5, pp. 1203-1233, May 2013, doi: 10.1109/J PROC.2012.2236291. (Year: 2013 ) (Year: 2013) (Year: 2013) (Year: 2013) (Year: 2013).*

Cerekovic et al., "Towards an Embodied Conversational Agent Talking in Croatian," 2007 9th International Conference on Telecommunications, 2007, pp. 41-48, doi: 10.1109/CONTEL.2007.381848. (Year: 2007) (Year: 2007) (Year: 2007) (Year: 2007) ( Year: 2007).*

Japanese Office Action dated Dec. 22, 2016, in related Japanese Patent Application No. 2014-037321.

Japanese Office Action dated Mar. 3, 2017, in related Japanese Patent Application No. 2013-094644.

Japanese Office Action dated Oct. 27, 2017, in related Japanese Patent Application No. 2013-094644.

G.R. Hiertz et al., "IEEE 802.11s: WLAN mesh standardization and high performance extensions," in IEEE Network, vol. 22, No. 3, pp. 12-19, May-Jun. 2008, doi: 10.1109/MNET.2008.4519960. (Year: 2008).

W.Kiess, T. Elsner, B. Scheuermann and M. Mauve, "Global Grassroots WiFi Sharing," 2010 IEEE Wireless Communication and Networking Conference, Sydney, NSW, Australia, 2010, pp. 1-6, doi: 10.1109/WCNC.2010.5506697 (Year: 2010).

\* cited by examiner

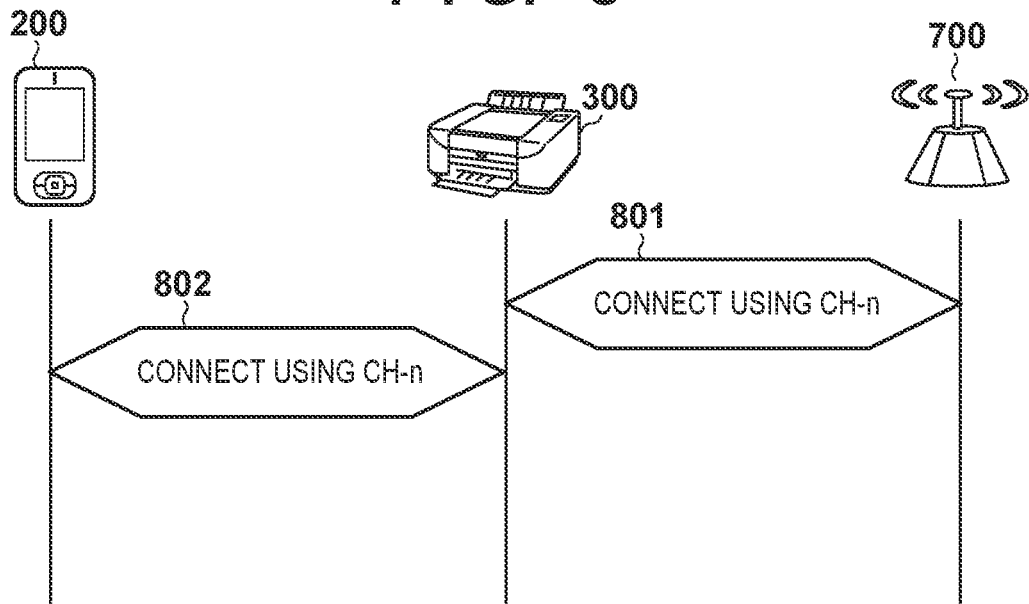
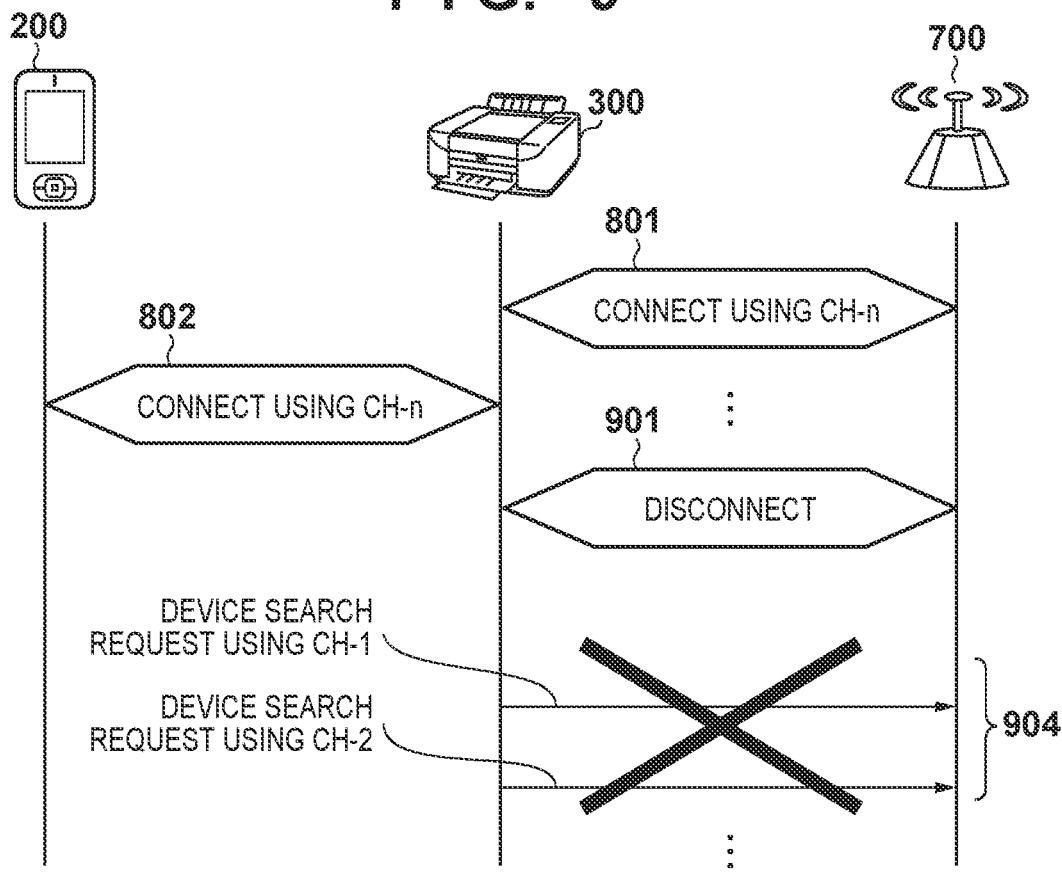

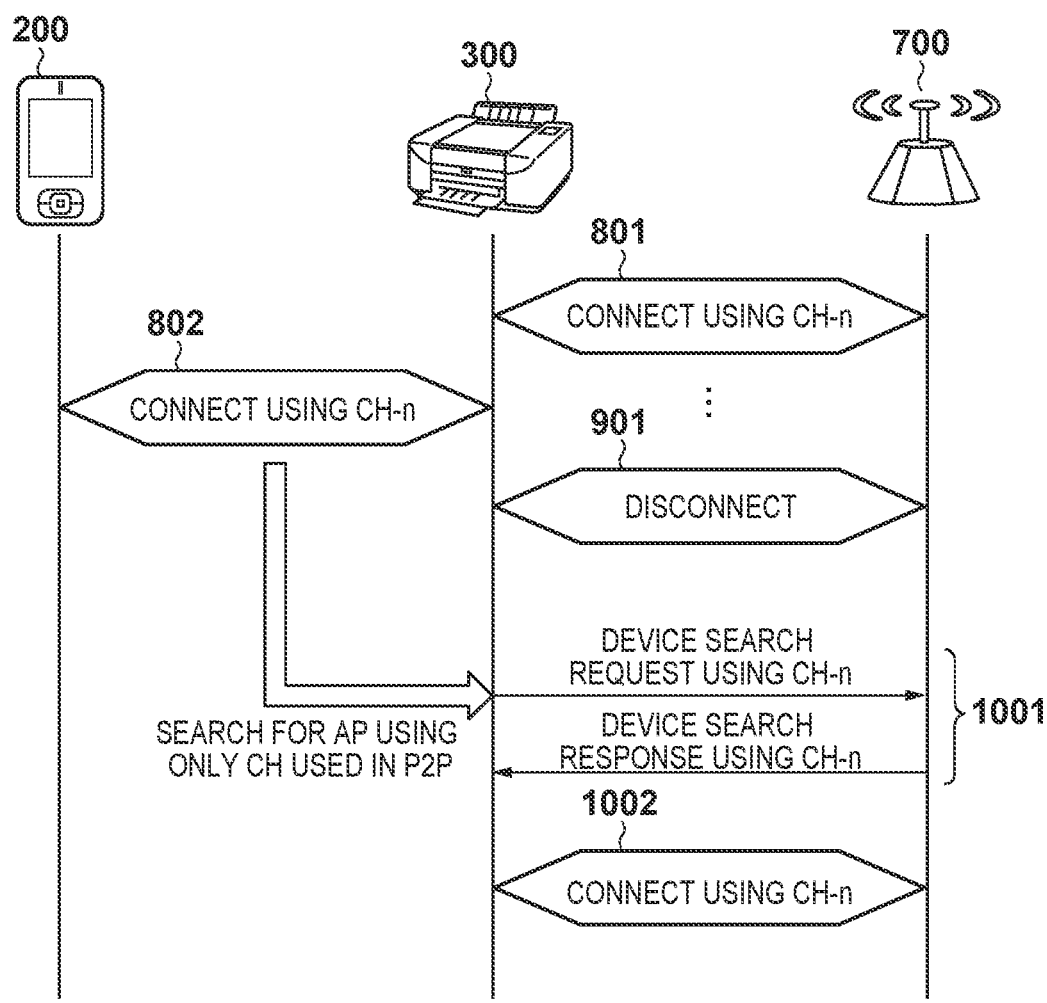

COMMUNICATING APPARATUS, COMMUNICATION METHOD, AND STORAGE MEDIUM STORING PROGRAM

This application is a continuation of application Ser. No. 17/740,642, filed May 10, 2022, which is a continuation of application Ser. No. 16/857,323, filed Apr. 24, 2020, now U.S. Pat. No. 11,356,836, issued Jun. 7, 2022, which is a continuation of application Ser. No. 15/825,608, filed Nov. 29, 2017, now U.S. Pat. No. 10,667,117, issued May 26, 2020, which is a continuation of application Ser. No. 15/646,396, filed Jul. 11, 2017, now U.S. Pat. No. 9,867,029, issued Jan. 9, 2018, which is a continuation of application Ser. No. 14/257,139, filed Apr. 21, 2014, now U.S. Pat. No. 9,730,045, issued Aug. 8, 2017.

BACKGROUND OF THE INVENTION

Field of the Invention

The present invention relates to a communicating apparatus for performing wireless communication via a wireless channel, a communication method, and a storage medium storing a program.

Description of the Related Art

In a wireless communication system, in addition to a method (for example, an infrastructure mode) of establishing a wireless connection with a partner apparatus via an access point, there is known a peer-to-peer (P2P) wireless connection method in which a self apparatus or a partner apparatus serves as an access point, thereby directly establishing a wireless connection with the partner apparatus without intervention of a third apparatus.

There is known, for example, Wi-Fi Direct® as a standard for implementing such P2P wireless connection method. A Wi-Fi Direct compatible apparatus can serve as an access point (group owner), thereby allowing direct wireless connection with a partner apparatus. At this time, whether the partner apparatus or the self apparatus serves as an access point is decided according to a sequence called Group Owner Negotiation (Japanese Patent Laid-Open No. 2011-249960).

It is possible to simultaneously execute the above-described two different wireless connection methods in one apparatus. This is a case in which a self apparatus serves as a client to establish a wireless connection with an access point while serving as a group owner to establish a P2P wireless connection with another apparatus serving as a client. In this case, two channels are required as wireless interfaces. However, assigning a plurality of channels to one wireless IC chip makes an arrangement very complicated. When simultaneously executing the two wireless connection methods, therefore, it is desirable to use a common channel in the methods.

In general, if the self apparatus serves as a client, an access point has a leading role in deciding a channel to be used. Alternatively, if the self apparatus serves as a group owner, a channel to be used is decided by comparing client channel information obtained by Group Owner Negotiation with its usable channels.

Assume that the above self apparatus, access point, and client are wirelessly connected by a common channel. In this case, if the self apparatus and the access point are disconnected, the self apparatus has no right to decide a channel, and may not be able to perform reconnection with a channel before disconnection.

SUMMARY OF THE INVENTION

An aspect of the present invention is to eliminate the above-mentioned problems with the conventional technology. The present invention provides a communicating apparatus, a communication method, and a storage medium storing a program, in which when simultaneously (concurrently) performing wireless communication operations using a plurality of wireless communication methods, even if some wireless connections are disconnected, it is possible to appropriately restart the wireless connections.

The present invention in its one aspect provides a communicating apparatus comprising: a first communication unit configured to communicate with an external apparatus using a first wireless communication method; and a second communication unit configured to communicate with an external apparatus using a second wireless communication method different from the first wireless communication method, wherein the second communication unit searches for an external apparatus which communicates by the second wireless communication method using a wireless channel used in communication by the first communication unit, and connects to the external apparatus.

According to the present invention, when simultaneously performing wireless communication operations using a plurality of wireless communication methods, even if some wireless connections are disconnected, it is possible to appropriately restart the wireless connections.

Further features of the present invention will become apparent from the following description of exemplary embodiments with reference to the attached drawings.

BRIEF DESCRIPTION OF THE DRAWINGS

FIG. 8 is a sequence chart for explaining a case in which wireless connection is performed using a channel common in the system;
FIG. 9 is a sequence chart showing a case in which communication between the MFP and the access point is disconnected;
FIG. 10 is a sequence chart for explaining a channel decision sequence according to the first embodiment.

DESCRIPTION OF THE EMBODIMENTS

Figure 1:
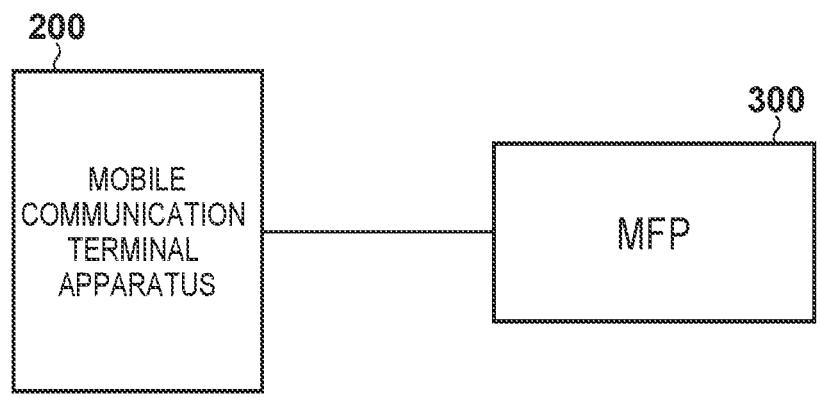
FIG. 1 is a view showing the configuration of a system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

First Embodiment

FIG. 1 is a view showing the configuration of a wireless communication system including a mobile communication terminal apparatus and a print apparatus (MFP). A mobile communication terminal apparatus 200 is an apparatus including a wireless LAN (WLAN) communication unit and a near field wireless communication unit. Note that near field wireless communication indicates wireless communication whose communication range is a relatively narrow predetermined range (for example, 1 m to several cm or less), which is represented by NFC. The mobile communication terminal apparatus 200 may be a personal information terminal such as a PDA (Personal Digital Assistant), a mobile phone, a digital camera, or the like, and can perform wireless communication (WLAN) with a print apparatus 300. The print apparatus (MFP) 300 need only be wirelessly communicable with the mobile communication terminal apparatus 200, and may additionally have a reading function (scanner), a FAX function, and a telephone function. In this embodiment, an MFP (Multi Function Printer) having a reading function and a printing function will be exemplified. Each of the mobile communication terminal apparatus 200 and the MFP 300 has a near field wireless communication unit using NFC. Even if no power is supplied to the mobile communication terminal apparatus 200, it is possible to perform near field wireless communication by moving the mobile communication terminal apparatus 200 closer to the MFP 300 within a predetermined distance where NFC communication is possible. The MFP 300 can wirelessly communicate with a terminal on a network (network in which communication can be performed using TCP/IP) using a WLAN communication unit. One or both of the mobile communication terminal apparatus 200 and the MFP 300 may perform wireless communication using only the WLAN communication unit without the near field wireless communication unit. Note that the mobile communication terminal apparatus 200 and the MFP 300 can execute processing corresponding to a plurality of print services via a WLAN, as will be described later.

Figure 2:
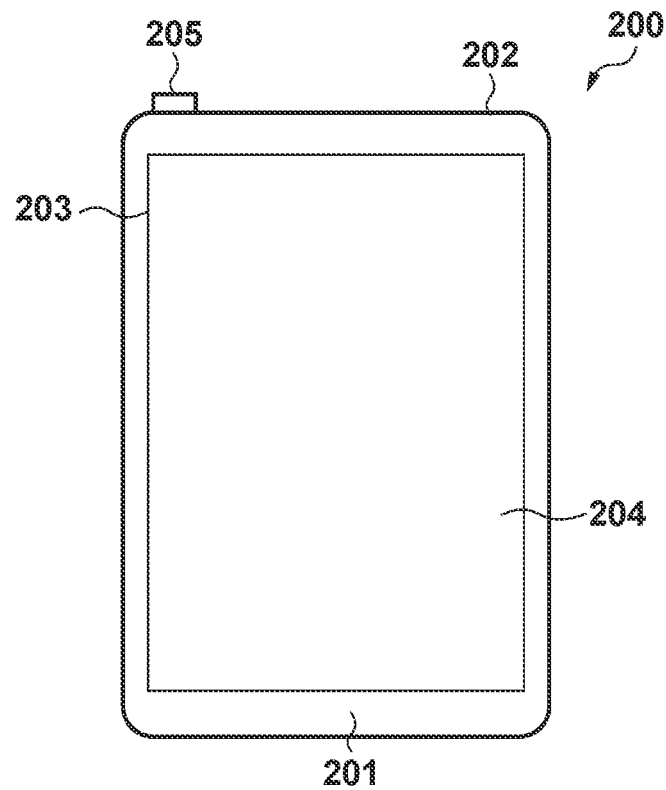
FIG. 2 is a view showing the outer appearance of a mobile communication terminal apparatus.

FIG. 2 is a view showing the outer appearance of the mobile communication terminal apparatus 200. In this embodiment, a smartphone will be exemplified. The smartphone indicates a multi-function mobile phone which incorporates a camera, web browser, email function, and the like in addition to functions of a mobile phone. An NFC unit 201 serving as a near field wireless communication unit is a unit for performing communication using NFC. When the NFC unit 201 is moved closer to a partner NFC unit within a predetermined distance (for example, about 10 cm), they can communicate with each other using NFC.

A WLAN unit 202 is a unit used to perform communication by WLAN. Assume that the WLAN unit 202 can perform data (packet) communication in a WLAN system complying with, for example, IEEE802.11 series. Examples of wireless communication using the WLAN unit 202 include communication based on Wi-Fi Direct (WFD), and communication using a software AP mode, ad hoc mode, and infrastructure mode. A display unit 203 is a display having an LCD display mechanism. An operation unit 204 includes a touch-panel operation mechanism, and detects an operation by the user. As a representative operation method, the display unit 203 displays button icons and a software keyboard, and when the user touches them, operation events are detected. A power key 205 is a hard key used to turn on/off the power.

Figure 3A:
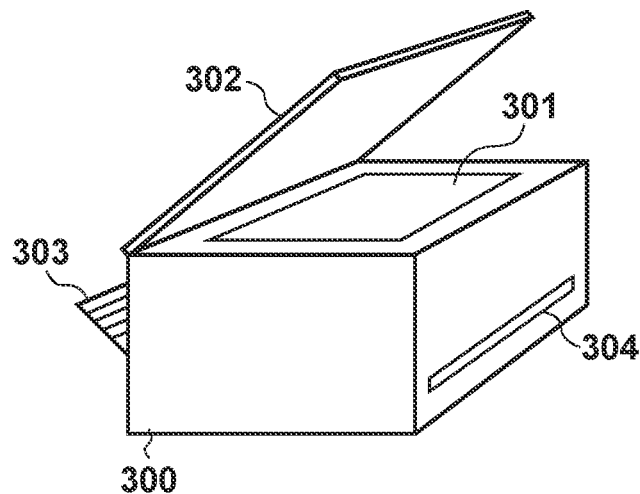
FIGS. 3A and 3B are views showing the outer appearance of an MFP.
Figure 3B:
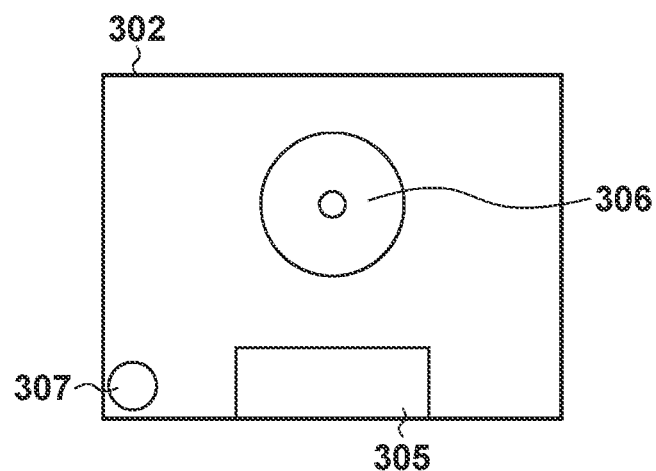

FIGS. 3A and 3B are views showing the outer appearance of the MFP 300. Referring to FIG. 3A, a document table 301 is a glass-like transparent table on which a document to be read by a scanner (reading unit) is placed. A document cover 302 is a cover used to press a document when the scanner reads the document, and prevent external leakage of light from a light source, with which the document is irradiated at the time of reading. A printing paper insert port 303 is an insert port on which paper sheets of various sizes can be set. Paper sheets set on the printing paper insert port 303 are conveyed one by one to a printing unit, and are discharged from a printing paper discharge port 304 after printing is performed by the printing unit.

Referring to FIG. 3B, an operation display unit 305 and an NFC unit 306 are arranged on the upper portion of the document cover 302. The operation display unit 305 will be described in detail with reference to FIG. 4. The NFC unit 306 is a unit used to perform near field wireless communication, and is a place where the mobile communication terminal apparatus 200 is moved closer to the MFP 300. A predetermined distance (about 10 cm) from the NFC unit 306 is an effective distance of NFC communication. A WLAN antenna 307 is an antenna which is used to perform communication by WLAN and is embedded in the MFP.

Figure 4:
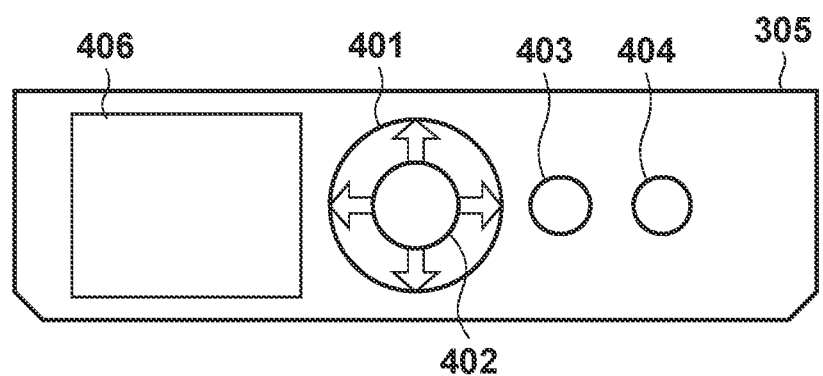
FIG. 4 is a plan view showing an operation display unit.

FIG. 4 is a plan view showing the operation display unit 305. A display unit 406 is a display screen used to display images and a user interface such as an operation menu, and includes, for example, a dot matrix LCD. A 4-way selector 401 is used for operations such as cursor movements on the display unit 406. A set key 402 is a key used to input settings. A function key 403 is used for an operation such as a function setting operation. A start key 404 is used to issue a function execution instruction such as a print start instruction.

Figure 5:
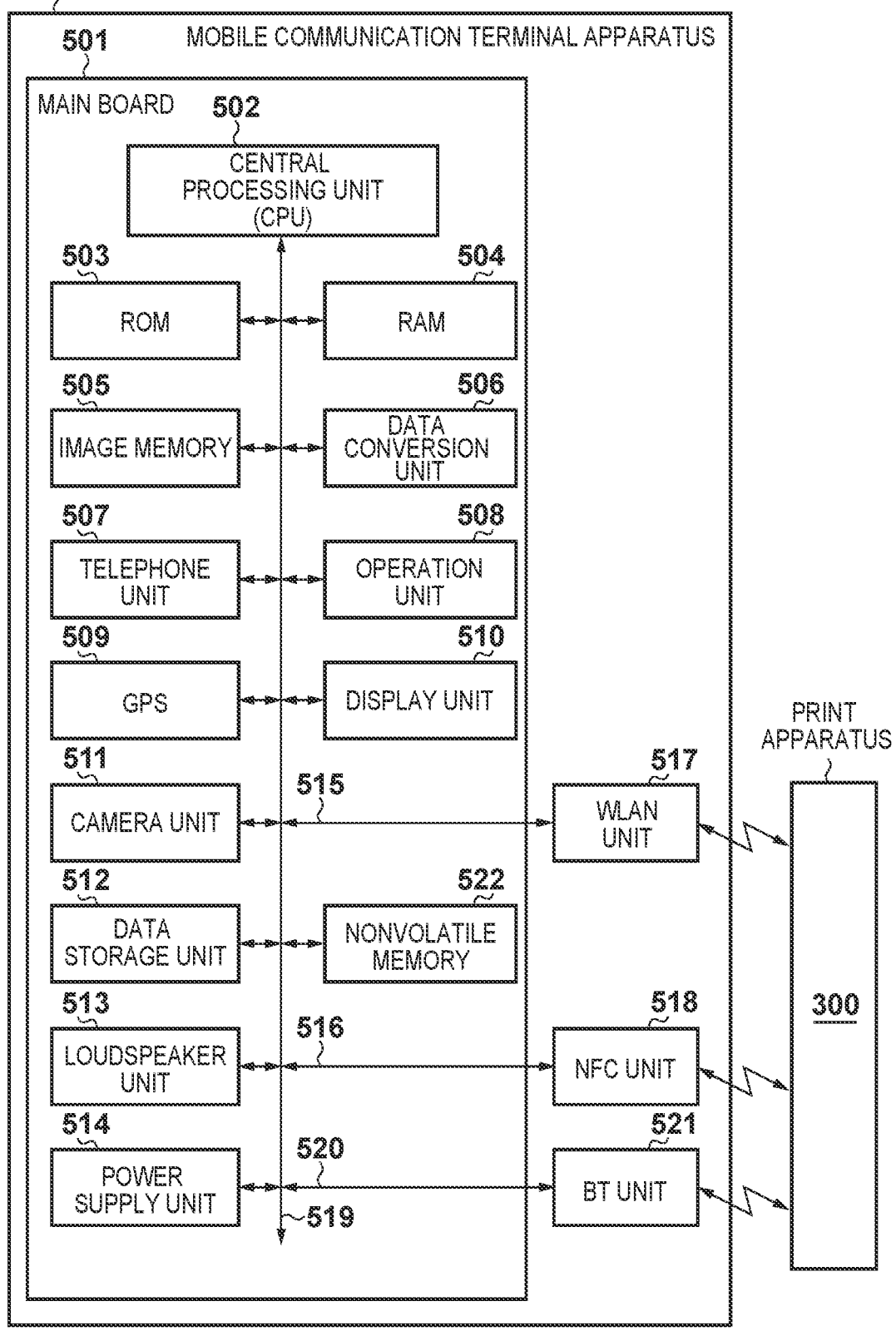
FIG. 5 is a block diagram showing the arrangement of the mobile communication terminal apparatus.

FIG. 5 is a block diagram showing the arrangement of the mobile communication terminal apparatus 200. The mobile communication terminal apparatus 200 includes a main board 501 for executing main control of the apparatus itself, a WLAN unit 517 for performing WLAN communication, an NFC unit 518 for performing NFC communication, and a BT (Bluetooth®) unit 521 for performing Bluetooth® communication.

In the main board 501, a CPU 502 is a system control unit, and controls the overall mobile communication terminal apparatus 200. The following processing by the mobile communication terminal apparatus 200 is executed under the control of the CPU 502. A ROM 503 stores control programs to be executed by the CPU 502, an embedded operating system (OS) program, and the like. In this embodiment, the respective control programs stored in the ROM 503 execute software control such as scheduling and task switching under the management of the embedded OS stored in the ROM 503.

A RAM 504 is implemented by an SRAM (Static RAM) or the like, stores data such as program control variables, also stores data such as setting values registered by the user and management data of the mobile communication terminal apparatus 200, and is allocated with various work buffer areas.

An image memory 505 is implemented by a memory such as a DRAM (Dynamic RAM), and temporarily stores image data received via a communication unit and those read out from a data storage unit 512 so as to be processed by the CPU 502. Note that the communication unit is a general term for communication functions including the WLAN unit 517, NFC unit 518, and BT unit 521.

A nonvolatile memory 522 is implemented by a memory such as a flash memory, and stores data to be saved even after power-off. Note that the memory structure is not limited to this. For example, the image memory 505 and the RAM 504 may share a memory, or data may be backed up in the data storage unit 512. In this embodiment, a DRAM is used as the image memory 505. However, the present invention is not limited to this since another storage medium such as a hard disk or a nonvolatile memory may be used.

A data conversion unit 506 executes analysis of data of various formats, and data conversion such as color conversion and image conversion. A telephone unit 507 controls a telephone line, and implements telephone communication by processing audio data input/output via a loudspeaker unit 513. An operation unit 508 controls signals of the operation unit 204 (FIG. 2). A GPS (Global Positioning System) 509 acquires position information such as the current latitude and longitude of the mobile communication terminal apparatus 200. A display unit 510 electronically controls the display contents of the display unit 203 (FIG. 2), allows various input operations, and can display operation states, status conditions, and the like of the MFP 300.

A camera unit 511 has a function of electronically recording and encoding an image input via a lens. An image captured by the camera unit 511 is saved in the data storage unit 512. The loudspeaker unit 513 realizes a function of inputting or outputting a speech for a telephone function, and also an alarm notification function and the like. A power supply unit 514 is implemented by a portable battery, and controls power supply to the apparatus. A power supply state includes a battery dead state in which the battery has no remaining amount, a power-off state in which the power key 205 is not pressed, an active state in which the apparatus is normally active, and a power saving state in which the apparatus is active but is set in a power saving mode.

The mobile communication terminal apparatus 200 incorporates three communication units used to perform wireless communication, and can perform wireless communication by WLAN, NFC, and Bluetooth®. Thus, the mobile communication terminal apparatus 200 performs data communication with another device such as an MFP. Each communication unit converts data into packets, and transmits the packets to the other device. Conversely, each communication unit converts packets coming from another external device into original data, and transmits the data to the CPU 502. The WLAN unit 517, NFC unit 518, and BT unit 521 are connected to the main board 501 via bus cables 515, 516, and 520, respectively. The WLAN unit 517, NFC unit 518, and BT unit 521 are units each used to attain communication complying with its standard.

The respective components (the ROM 503 to the power supply unit 514, WLAN unit 517, NFC unit 518, BT unit 521, and nonvolatile memory 522) of the main board 501 are connected to each other via a system bus 519 managed by the CPU 502.

Figure 6:
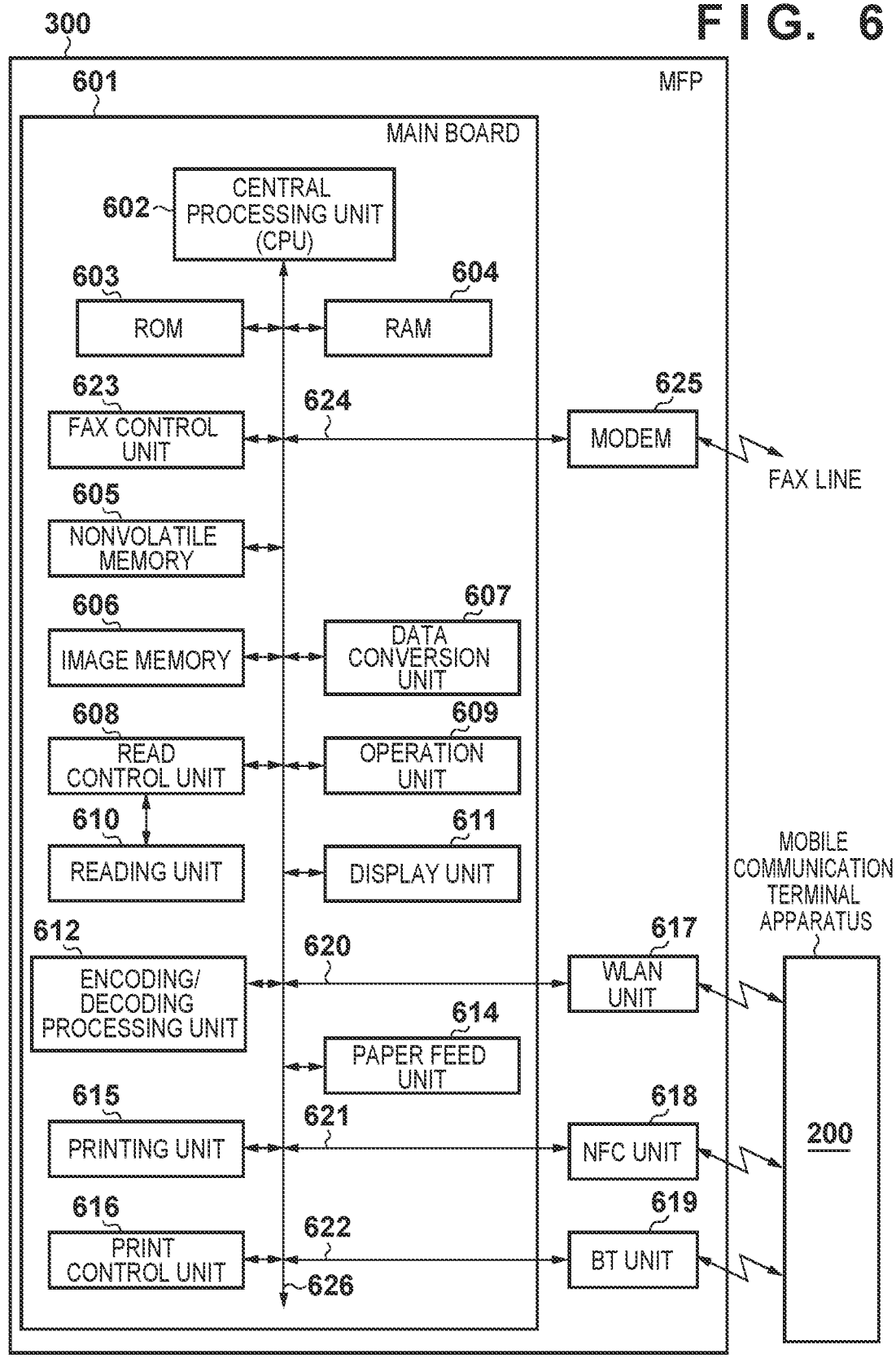
FIG. 6 is a block diagram showing the arrangement of the MFP.

FIG. 6 is a block diagram showing the arrangement of the MFP 300. The MFP 300 includes a main board 601 for executing main control of the apparatus itself, a WLAN unit 617 for performing WLAN communication, an NFC unit 618 for performing NFC communication, and a BT unit 619 for performing Bluetooth® communication.

In the main board 601, a CPU 602 is a system control unit, and controls the overall MFP 300. The following processing by the MFP 300 is executed under the control of the CPU 602. A ROM 603 stores control programs to be executed by the CPU 602, an embedded operating system (OS) program, and the like. In this embodiment, the respective control programs stored in the ROM 603 perform software control such as scheduling and task switching under the management of the embedded OS stored in the ROM 603. A RAM 604 is implemented by an SRAM (Static RAM) or the like, stores data such as program control variables, also stores data such as setting values registered by the user and management data of the MFP 300, and is allocated with various work buffer areas.

A nonvolatile memory 605 is implemented by a memory such as a flash memory, and stores data to be saved even after power-off. An image memory 606 is implemented by a memory such as a DRAM (Dynamic RAM), and stores image data received via a communication unit, those processed by an encoding/decoding processing unit 612, and those acquired via a memory card controller 516. Also, the memory structure is not limited to this, similarly to the memory structure of the mobile communication terminal apparatus 200. A data conversion unit 607 executes analysis of data of various formats, conversion from image data into print data, and the like. Note that the communication unit is a general term for communication functions including the WLAN unit 617, NFC unit 618, and BT unit 619.

A read control unit 608 controls a reading unit 610 (for example, a CIS image sensor (contact type image sensor)) to optically read an image on a document. Next, an image signal obtained by converting the read image into electrical image data is output. At this time, various kinds of image processing such as binarization processing and halftone processing may be performed for the image signal, thereby outputting the resultant data.

An operation unit 609 and a display unit 611 correspond to the operation display unit 305 shown in FIG. 4. The encoding/decoding processing unit 612 executes encoding/decoding processing and enlargement/reduction processing for image data (JPEG, PNG, or the like) handled by the MFP 300. A paper feed unit 614 holds paper sheets used in printing. A paper sheet can be fed from the paper feed unit 614 under the control of a print control unit 616. Especially, as the paper feed unit 614, a plurality of paper feed units can be prepared so as to hold a plurality of types of paper sheets in one apparatus. Then, the print control unit 616 can control to select a paper feed unit to be used to supply paper sheets.

The print control unit 616 performs various kinds of image processing such as smoothing processing, printing density correction processing, and color correction for image data to be printed, and outputs the resultant data to a printing unit 615. The printing unit 615 can adopt an inkjet printer which prints an image by discharging, from a printhead, ink supplied from an ink tank. The print control unit 616 also serves to periodically read out information of the printing unit 615, and update information in the RAM 604. More specifically, the print control unit 616 updates status information such as the remaining amount of an ink tank and a printhead state.

The MFP 300 also incorporates three communication units used to perform wireless communication, similarly to the mobile communication terminal apparatus 200, and a description of these communication units will be omitted since their functions are the same. Note that the WLAN unit 617 of the MFP 300 can perform wireless communication in a plurality of wireless communication modes simultaneously but uses the same wireless channel. The WLAN unit 617, NFC unit 618, and BT unit 619 are connected to the main board 601 via bus cables 620, 621, and 622, respectively. The respective components (the CPU 602 to the BT unit 619) of the main board 601 are connected to each other via a system bus 626 managed by the CPU 602.

[Peer-to-Peer Wireless Connection Method]

The mobile communication terminal apparatus 200 and the MFP 300 can establish a peer-to-peer (P2P) wireless connection complying with WFD. WFD is a standard stipulated by Wi-Fi Alliance, and described in "Wi-Fi Peer-to-Peer (P2P) Technical Specification Version 1.1". The mobile communication terminal apparatus 200 and MFP 300 which are WFD compatible apparatuses have a software access point (soft AP) function serving as an access point. This allows the mobile communication terminal apparatus 200 and the MFP 300 to directly, wirelessly connect with each other by WFD without intervention of another access point. Among a plurality of WFD compatible apparatuses, an apparatus to serve as a soft AP is decided according to a sequence called Group Owner Negotiation. An apparatus which is a WFD compatible apparatus and serves as an access point will be particularly referred to as a group owner hereinafter.

In addition to P2P wireless connection, in a wireless communication system including an access point and a client, an apparatus serving as an access point sends a beacon (Beacon) signal. Upon receiving the beacon signal, the client transmits a probe request command (Probe Request frame) to the access point. Especially for P2P wireless connection, the probe request command contains information (P2P elements) about P2P wireless connection. When the access point refers to the received probe request command, and transmits a probe response command (Probe Response frame), each apparatus can discover the partner apparatus (device search (Discovery)). After that, a sequence of, for example, confirming an IP address and device information indicating an apparatus type is executed, thereby allowing execution of various applications such as printing.

Two types of wireless communication modes are defined for WLAN of an apparatus according to this embodiment. One is a mode (called an infrastructure mode) in which the apparatus wirelessly connects to the partner apparatus via another apparatus serving as an access point, unlike P2P wireless connection. In the infrastructure mode, the self apparatus serves as a client. The other one is a mode in which the apparatus is a WFD compatible apparatus and serves as a group owner.

[Channel Decision Sequence in Each Mode]

Wireless connection is performed using a specific frequency band (wireless channel). To decide a channel to be used, with respect to channels usable by the client, the client sequentially confirms, with the access point, whether wireless connection is possible. The client then specifies a channel for which the access point has responded, and decides the channel as a channel to be used subsequently. That is, only if the client transmits a request command using a channel usable by the access point, the access point transmits a response command to the client.

Figure 7:
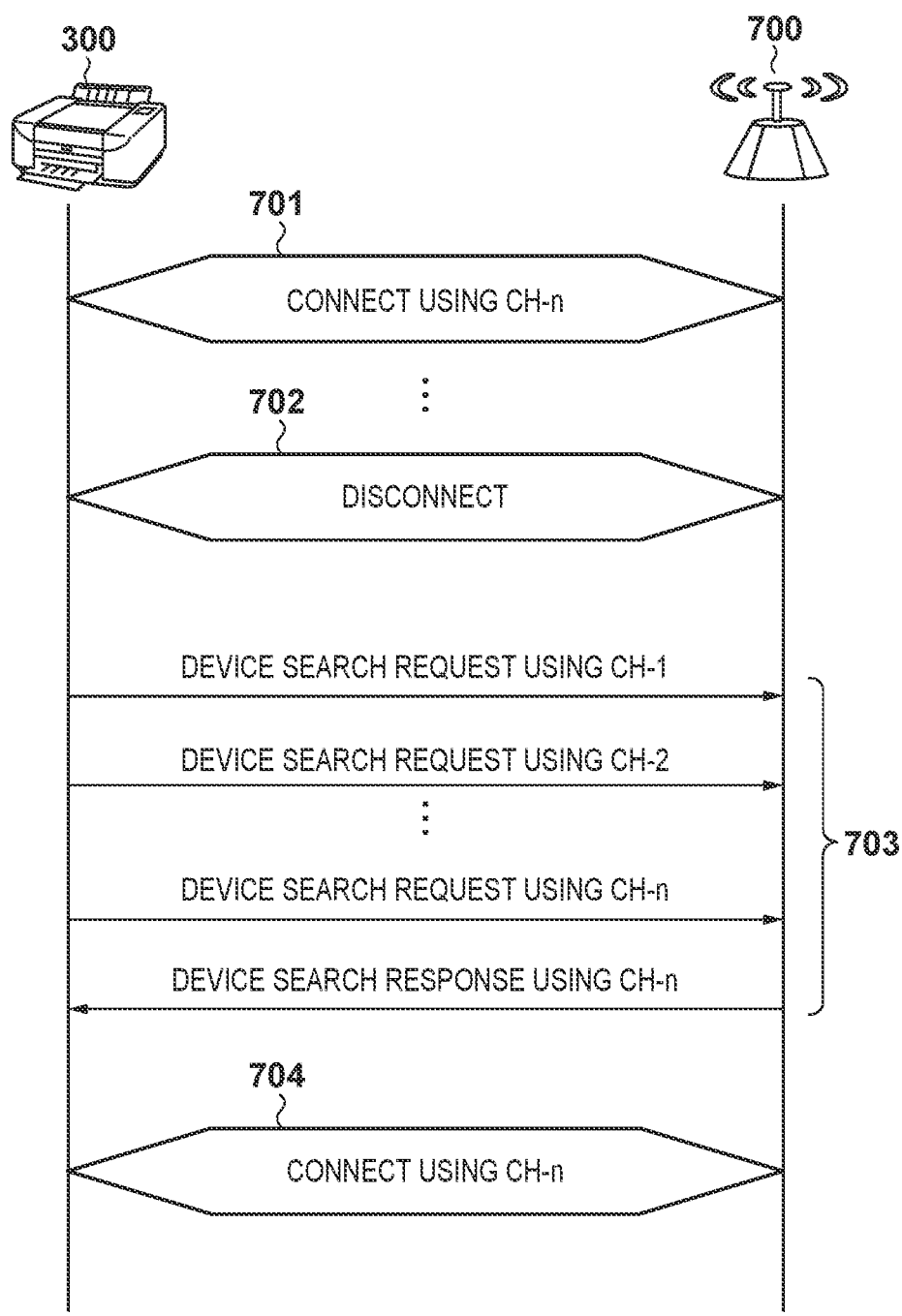
FIG. 7 is a sequence chart showing a channel decision sequence between the MFP and an access point.

FIG. 7 is a sequence chart for explaining a channel decision sequence between the MFP 300 and an access point 700, both of which are operating in the infrastructure mode. In a phase 701, the MFP 300 and the access point 700 are already wirelessly connected to each other via an nth (n is an arbitrary positive integer) channel. Assume that in a phase 702, the wireless connection is disconnected due to some factor such as end of an application or a radio wave state. In a phase 703, to transmit a device search request command, the MFP 300 serving as a client sequentially tries to perform wireless connection using each usable channel. Note that the device search request command corresponds to the above-described probe request command.

The access point 700 transmits no response command to a device search request command transmitted using a channel except for its usable channel. If, for example, the channel usable by the access point 700 is the nth channel, the access point 700 transmits no response command to a device search request command transmitted using a first channel. After transmitting the device search request command using the first channel, if the MFP 300 determines, due to a time-out or the like, that the access point 700 transmits no response, it transmits a device search request command using a second channel. The MFP 300 repeats the above attempt while incrementing the channel number. When the MFP 300 transmits a device search request command using the nth channel, the access point 700 transmits a device search response command since the channel is in an unused state. Note that the device search response command corresponds to the above-described probe response command. In a subsequent phase 704, the nth channel is used. In the phase 704, for example, an identification ID such as an SSID, a password, and the like are set, and an IP address is confirmed. After that, connection at the application level such as printing or facsimile is performed. Note that in the above example, a usable channel is searched for while incrementing the channel number by one from the first channel. However, the attempt order is not limited to this.

FIG. 8 is a sequence chart for explaining a channel decision sequence between the mobile communication terminal apparatus 200 serving as a client of a WFD compatible apparatus, the MFP 300 operating in the infrastructure mode and serving as a group owner, and the access point 700. Referring to FIG. 8, the MFP 300 operates in the infrastructure mode for the access point 700 and, at the same time, serves as a group owner for the mobile communication terminal apparatus 200. The MFP 300 can decide itself as a group owner according to a sequence called Group Owner Negotiation with the mobile communication terminal apparatus 200.

As shown in FIG. 8, when the MFP 300 is operating in the two modes simultaneously, in a phase 801 the MFP 300 decides a channel according to the sequence explained with reference to FIG. 7, and establishes a wireless connection with the access point 700. In this example, assume that wireless connection is performed using the nth channel usable by the access point 700.

In a phase 802, the MFP 300 performs Group Owner Negotiation with the mobile communication terminal apparatus 200, and performs connection using the nth channel used in communication with the access point 700. As described above, the phase 802 is performed after the phase 801 because the MFP 300 has no right to decide a channel since the MFP 300 serves as a client for the access point 700. Therefore, the access point 700 has a leading role in deciding a channel between the MFP 300 and the access point 700, and then the MFP 300 has a leading role in deciding a channel between the mobile communication terminal apparatus 200 and the MFP 300. In the phase 802, after Group Owner Negotiation is performed, processing of confirming an IP address and information indicating a push button method, PIN code method, and the like is executed, thereby performing connection at the application level such as printing or facsimile.

FIG. 9 is a sequence chart showing a case in which communication between the MFP 300 and the access point 700 is disconnected after the phase 802. As shown in FIG. 9, in a phase 901 after the phase 802, communication between the MFP 300 and the access point 700 is disconnected due to some factor such as end of an application or a radio wave state. In this case, the MFP 300 cannot make an attempt (phase 904) to transmit a device search request command as shown in FIG. 7 to the access point 700. This is because the MFP 300 is already wirelessly connected with the mobile communication terminal apparatus 200 using the nth channel, needs to maintain the wireless connection as a group owner, and thus cannot transmit a search request command using another channel.

FIG. 10 is a sequence chart for explaining a channel decision sequence according to this embodiment. In this embodiment, after communication between the MFP 300 and the access point 700 is disconnected in the phase 901, the MFP 300 transmits a device search request command to the access point 700 using the nth channel used in the phase 802. In a phase 1001, the MFP 300 transmits the device search request command using the nth channel, and then the access point 700 transmits a device search response command. In a subsequent phase 1002, wireless connection is performed using the nth channel. As a result, before disconnection, the MFP 300 can return to a state in which it serves as a client for the access point 700 and as a group owner for the mobile communication terminal apparatus 200 to commonly use the nth channel.

Figure 11:
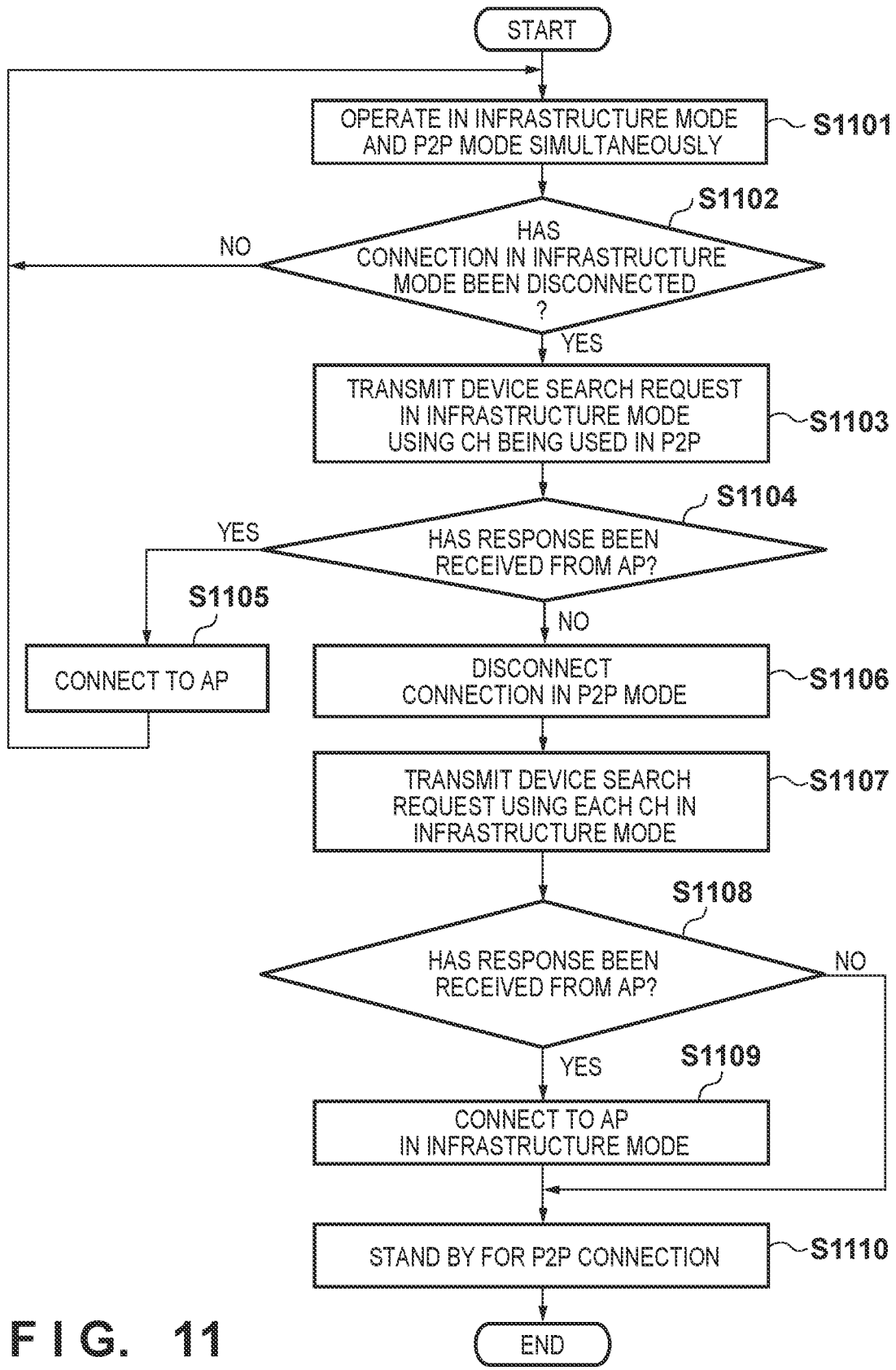
FIG. 11 is a flowchart illustrating the procedure of a channel decision method.

FIG. 11 is a flowchart illustrating the procedure of a channel decision method according to this embodiment. Each process shown in FIG. 11 is implemented when, for example, the CPU 602 of the MFP 300 loads a control program stored in the ROM 603 into the RAM 604, and executes the control program. The flowchart of FIG. 11 shows processing executed in the wireless communication system shown in FIG. 10.

In step S1101, the MFP 300 operates as a client in the infrastructure mode for the access point 700 and, at the same time, operates as a group owner for the mobile communication terminal apparatus 200.

In step S1102, the MFP 300 determines whether communication between the MFP 300 and the access point 700 has been disconnected due to some factor such as end of an application or a radio wave state. If it is determined that communication has not been disconnected, the process returns to step S1101; otherwise, the process advances to step S1103.

In step S1103, the MFP 300 transmits a device search request command to the access point 700 using a channel which was used by the MFP 300 serving as a group owner in P2P wireless connection before the disconnection determined in step S1102. The channel which was used by the MFP 300 serving as a group owner in P2P wireless connection is the nth channel used in the phase 802 shown in FIG. 10 with the mobile communication terminal apparatus 200. In step S1104, the MFP 300 determines whether a device search response command has been received from the access point 700. If it is determined that a device search response command has been received, the process advances to step S1105. If it is determined, due to a time-out or the like, that no device search response command has been received, the process advances to step S1106. In step S1105, the MFP 300 executes the subsequent phase 1002 using the channel used in step S1103, and the process returns to step S1101.

On the other hand, a case in which it is determined in step S1104 that no device search response command has been received corresponds to a case in which the channel used by the access point 700 has been changed from a channel (the nth channel) previously used. In step S1106, the MFP 300 disconnects the wireless connection with the mobile communication terminal apparatus 200. In step S1107, to transmit a device search request command, the MFP 300 sequentially tries its usable channels for the access point 700.

In step S1108, the MFP 300 determines whether a device search response command has been received from the access point 700. If it is determined that a device search response command has been received, the process advances to step S1109. If it is determined, due to a time-out or the like, that no device search response command has been received, the process advances to step S1110. In step S1109, the MFP 300 executes a subsequent sequence using the channel used by the device search response command which has been determined to have been received in step S1108. The channel used in step S1109 is not always the nth channel. In step S1110, the MFP 300 stands by for P2P connection with the mobile communication terminal apparatus 200.

Second Embodiment

In the second embodiment, the difference from the first embodiment will be described below. The same reference numerals as those in the first embodiment denote the same processes as those in the first embodiment.

Figure 12:
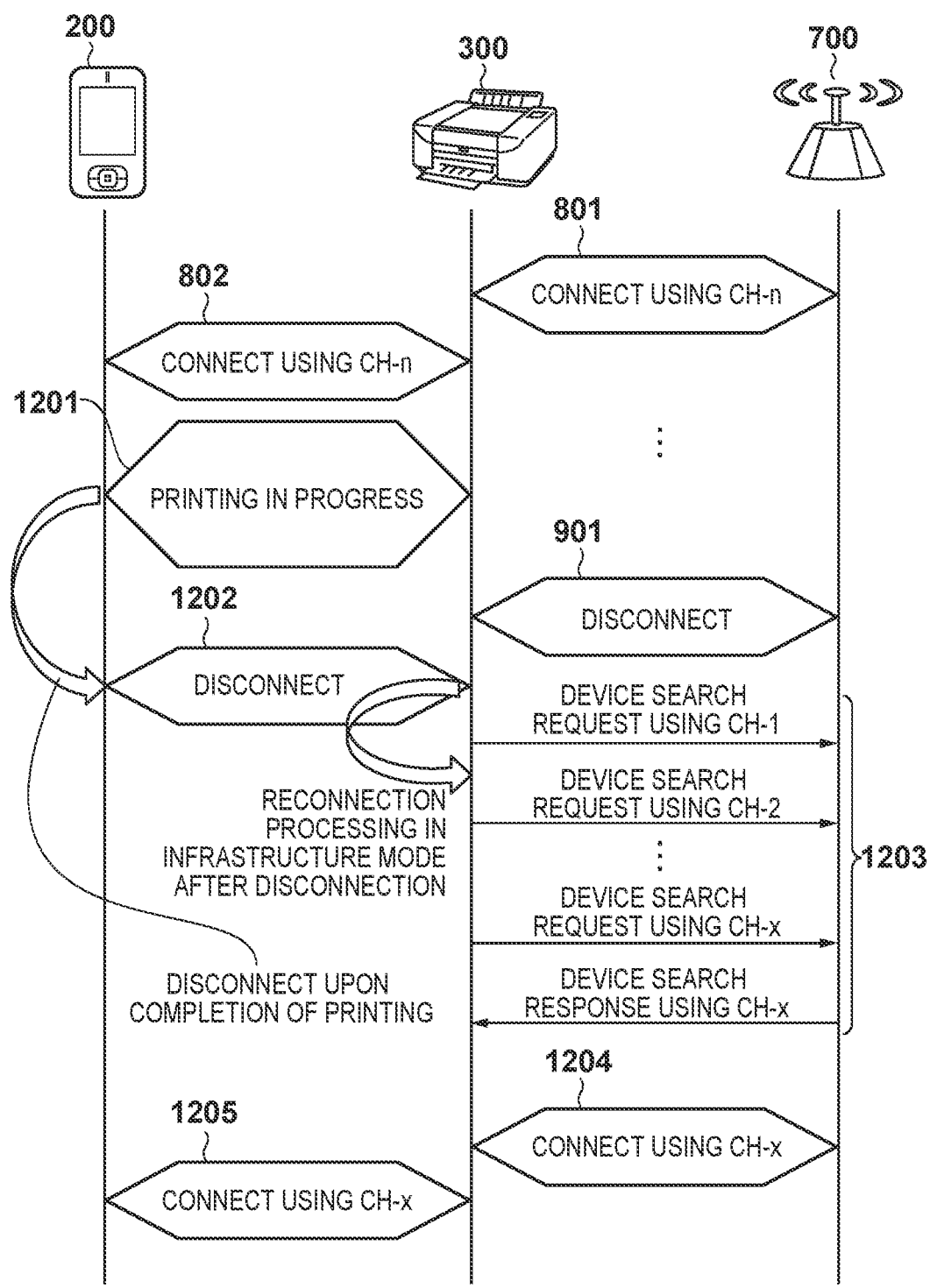
FIG. 12 is a sequence chart for explaining a channel decision sequence according to the second embodiment.

FIG. 12 is a sequence chart for explaining a channel decision sequence according to this embodiment. Referring to FIG. 12, after a mobile communication terminal apparatus 200 and an MFP 300 are wirelessly connected to each other using an nth channel in a phase 802, a printing application executes printing (a phase 1201).

In this embodiment, when a wireless connection between the MFP 300 and an access point 700 is disconnected in a phase 901, if processing by an application such as a printing application is in progress between the mobile communication terminal apparatus 200 and the MFP 300, end of the processing is waited for. That is, in FIG. 12, after printing by the printing application in the phase 1201 ends, and the wireless connection with the mobile communication terminal apparatus 200 is disconnected, the MFP 300 transmits a device search request command to the access point 700 (a phase 1203). To transmit a device search request command, the MFP 300 sequentially confirms usable channels. Assume, for example, that a channel usable by the access point 700 at this time is an xth (x is an arbitrary positive integer) channel. In this case, when the MFP 300 transmits a device search request command using the xth channel, the access point 700 transmits a device search response command using the xth channel. After that, in a phase 1204, wireless connection is performed between the MFP 300 and the access point 700 using the xth channel. Subsequently, in a phase 1205, upon receiving a device search request command from the mobile communication terminal apparatus 200, the MFP 300 establishes a wireless connection by transmitting a device search response command using the xth channel.

As a result, even if the processing by the application is in progress with the mobile communication terminal apparatus 200 when the wireless connection with the access point 700 is disconnected, it is possible to recover a wireless connection using a channel common in the system upon completion of the application without impairing execution of the processing of the application.

Figure 13:
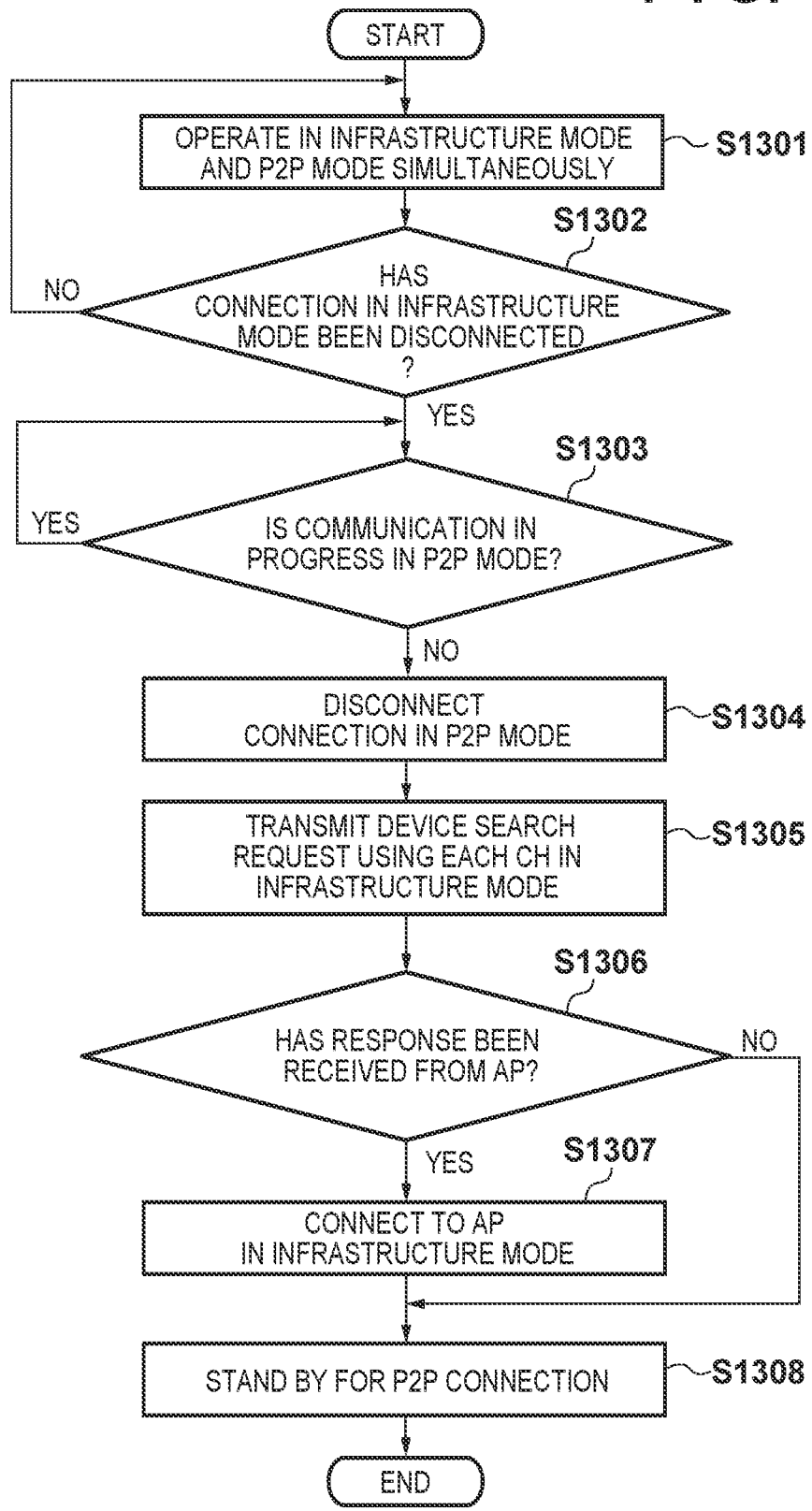
FIG. 13 is a flowchart illustrating the procedure of a channel decision method.

FIG. 13 is a flowchart illustrating the procedure of a channel decision method according to this embodiment. Each process shown in FIG. 13 is implemented when, for example, the CPU 602 of the MFP 300 loads a control program stored in the ROM 603 into the RAM 604, and executes the control program. The flowchart of FIG. 13 shows processing executed in the wireless communication system shown in FIG. 12.

In step S1301, the MFP 300 operates in the infrastructure mode for the access point 700 and, at the same time, operates as a group owner for the mobile communication terminal apparatus 200.

In step S1302, the MFP 300 determines whether communication between the MFP 300 and the access point 700 has been disconnected due to some factor such as end of an application or a radio wave state. If it is determined that communication has not been disconnected, the process returns to step S1301; otherwise, the process advances to step S1303.

In step S1303, the MFP 300 determines whether it has established a P2P wireless connection as a group owner. That is, as shown in FIG. 12, if printing by the printing application is in progress with the mobile communication terminal apparatus 200, it is determined in step S1303 that a P2P wireless connection has been established, and the processing in step S1303 is repeated. On the other hand, if it is determined that a P2P wireless connection has not been established, the process advances to step S1304.

In step S1304, the MFP 300 disconnects the wireless connection with the mobile communication terminal apparatus 200. In step S1305, the MFP 300 transmits a device search request command to the access point 700 by sequentially using channels usable by the MFP 300. In step S1306, the MFP 300 determines whether a device search response command has been received from the access point 700. If it is determined that a device search response command has been received, the process advances to step S1307. If it is determined, due to a time-out or the like, that no device search response command has been received, the process advances to step S1308.

In step S1307, the MFP 300 executes a subsequent wireless connection sequence using the channel used by the device search response command which has been determined to have been received in step S1306. In step S1308, the MFP 300 stands by for P2P connection with the mobile communication terminal apparatus 200. According to the first and second embodiments, when the MFP 300 operates in the infrastructure mode and, at the same time, operates as a group owner, even if a wireless connection with the access point is disconnected, it is possible to recover a wireless connection using a channel common in the system. That is, when performing wireless communication in a plurality of wireless communication modes simultaneously, the MFP 300 serves as a client in one mode and serves as an access point in the other mode. In this case, even if one wireless connection is disconnected, it is possible to appropriately restart the wireless communication using the common channel. Furthermore, when performing wireless communication in a plurality of wireless communication modes simultaneously, it is not necessary to set different channels in the respective modes, thereby reducing the processing load.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A program may be executed by a single computer or a plurality of computers in cooperation. Further, hardware such as a circuit for executing part of the program may be arranged, and the processing described in the embodiment may be executed by cooperation between the hardware and the computer which executes the software.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-094644, filed Apr. 26, 2013, which is hereby incorporated by reference herein in its entirety.

What is claimed is:

1. A communication apparatus, the apparatus comprising:
at least one processor configured to:
perform a first communication processing to a communication partner apparatus based on a Bluetooth standard using a first communication unit;
establish a wireless connection based on an infrastructure mode between the communication apparatus and an external access point, wherein the wireless connection is established with a second communication unit which is different from the first communication unit;
establish a direct wireless connection between the communication apparatus and the communication partner apparatus, wherein the direct wireless connection is established without the external access point;
concurrently perform the wireless connection between the communication apparatus and the external access point and the direct wireless connection between the communication apparatus and the communication partner apparatus with each other; and
search the external access point in a state that the direct wireless connection between the communication apparatus and the communication partner apparatus is maintained, in a case where the wireless connection between the communication apparatus and the external access point is disconnected,
wherein the external access point is external to the communication apparatus and is external to the communication partner apparatus.

2. The apparatus according to claim 1, wherein when a channel is selected by the external access point, the wireless connection between the communication apparatus and the external access point is established using the selected channel, and the direct wireless connection between the communication apparatus and the communication partner apparatus is established using the selected channel.

3. The apparatus according to claim 2, wherein the direct wireless connection between the communication apparatus and the communication partner apparatus is established using the selected channel, after the wireless connection between the communication apparatus and the external access point is established using the selected channel.

4. The apparatus according to claim 2, wherein the direct wireless connection is maintained between the communication apparatus and the communication partner apparatus while the external access point is searched preferentially using the selected channel of a plurality of channels.

5. The apparatus according to claim 4, wherein
in a case where the external access point which is able to be connected using the selected channel is not found in the search, the at least one processor is further configured to disconnect the direct wireless connection using the selected channel between the communication apparatus and the communication partner apparatus.

6. The apparatus according to claim 5, wherein
the at least one processor is further configured to search the external access point which is able to be connected using a second channel different from the selected channel, after the direct wireless connection using the selected channel between the communication apparatus and the communication partner apparatus is disconnected.

7. The apparatus according to claim 6, wherein
in a case where the external access point which is able to be connected using the second channel is found, the at least one processor is further configured to connect the communication apparatus to the external access point using the second channel, and wait for an establishment of the direct wireless connection using the second channel.

8. The apparatus according to claim 4, wherein
in a case where the external access point which is able to be connected using the selected channel is not found in the search,
if processing with the direct wireless connection using the selected channel between the communication apparatus and the communication partner apparatus is in progress, the at least one processor is further configured to disconnect the direct wireless connection between the communication apparatus and the communication partner apparatus after the processing is finished.

9. The apparatus according to claim 1, further comprising a print unit to perform print processing based on image data.

10. The apparatus according to claim 9, wherein the print processing is performed by discharging ink.

11. The apparatus according to claim 10, wherein a remaining amount of the ink is managed as status information of the communication apparatus.

12. The apparatus according to claim 1, wherein the direct wireless connection is established based on Wi-Fi Direct.

13. The apparatus according to claim 1, wherein the direct wireless connection is established using an Access Point function of a communication.

14. A communication apparatus operating method comprising the steps of:
performing a first communication processing to a communication partner apparatus based on a Bluetooth standard using a first communication unit;
establishing a wireless connection based on an infrastructure mode between the communication apparatus and an external access point, wherein the wireless connection is established with a second communication unit which is different from the first communication unit;
establishing a direct wireless connection between the communication apparatus and the communication partner apparatus, wherein the direct wireless connection is established without the external access point;
concurrently performing the wireless connection between the communication apparatus and the external access point and the direct wireless connection between the communication apparatus and the communication partner apparatus with each other; and
searching the external access point in a state that the direct wireless connection between the communication apparatus and the communication partner apparatus is maintained, in a case where the wireless connection between the communication apparatus and the external access point is disconnected,
wherein the external access point is external to the communication apparatus and is external to the communication partner apparatus.

15. The method according to claim 14, further comprising the steps of, when a channel is selected by the external access point, establishing the wireless connection between the communication apparatus and the external access point using the selected channel, and establishing the direct wireless connection between the communication apparatus and the communication partner apparatus using the selected channel.

16. The method according to claim 15, further comprising the step pf establishing the direct wireless connection between the communication apparatus and the communication partner apparatus using the selected channel, after the wireless connection between the communication apparatus and the external access point is established using the selected channel.

17. The method according to claim 15, further comprising the step of maintaining the direct wireless connection between the communication apparatus and the communication partner apparatus while the external access point is searched preferentially using the selected channel of a plurality of channels.

18. The method according to claim 17, further comprising the step of, in a case where the external access point which is able to be connected using the selected channel is not found in the search, disconnecting the direct wireless connection using the selected channel between the communication apparatus and the communication partner apparatus.

19. The method according to claim 17, further comprising the step of, in a case where the external access point which is able to be connected using the selected channel is not found in the search,
if processing with the direct wireless connection using the selected channel between the communication apparatus and the communication partner apparatus is in progress, disconnecting the direct wireless connection between the communication apparatus and the communication partner apparatus after the processing is finished.

20. The method according to claim 19, further comprising the step of searching the external access point which is able to be connected using a second channel different from the selected channel, after the direct wireless connection using the selected channel between the communication apparatus and the communication partner apparatus is disconnected.

21. The method according to claim 20, further comprising the steps of, in a case where the external access point which is able to be connected using the second channel is found, connecting the communication apparatus to the external access point using the second channel, and waiting for an establishment of the direct wireless connection using the second channel.

22. The method according to claim 14, further comprising the step of performing print processing based on image data.

23. The method according to claim 22, wherein the print processing is performed by discharging ink.

24. The method according to claim 23, wherein a remaining amount of the ink is managed as status information of the communication apparatus.

25. The method to claim 14, wherein the direct wireless connection is established based on Wi-Fi Direct.

26. The method according to claim 14, wherein the direct wireless connection is established using an Access Point function of a communication.

27. A non-transitory computer-readable storage medium storing a predetermined program, wherein the predetermined program causes a computer to perform an operation, comprising:

performing a first communication processing to a communication partner apparatus based on a Bluetooth standard using a first communication unit;

establishing a wireless connection based on an infrastructure mode between the communication apparatus and an external access point, wherein the wireless connection is established with a second communication unit which is different from the first communication unit;

establishing a direct wireless connection between the communication apparatus and the communication partner apparatus, wherein the direct wireless connection is established without the external access point;

concurrently performing the wireless connection between the communication apparatus and the external access point and the direct wireless connection between the communication apparatus and the communication partner apparatus with each other; and searching the external access point in a state that the direct wireless connection between the communication apparatus and the communication partner apparatus is maintained, in a case where the wireless connection between the communication apparatus and the external access point is disconnected, wherein the external access point is external to the communication apparatus and is external to the communication partner apparatus.

\* \* \* \* \*